Nov. 22, 1927.

R. M. LOVEJOY 1,649,835

SPRING SUSPENSION FOR VEHICLES

Filed Jan. 12, 1925

Inventor.
Ralph M. Lovejoy
by Heard Smith & Tennant.
Attys

Patented Nov. 22, 1927.

1,649,835

UNITED STATES PATENT OFFICE

RALPH M. LOVEJOY, OF BOSTON, MASSACHUSETTS.

SPRING SUSPENSION FOR VEHICLES.

Application filed January 12, 1925. Serial No. 1,788.

This invention relates to improvements in spring suspension mechanisms for vehicles and the objects thereof are broadly to provide a novel spring shackle and also to provide novel means for supporting the vehicle frame by the spring which will permit a greater flexibility of the spring than in previous constructions and consequently will permit the use of a shorter spring to provide the desired resilience than in previous constructions.

More particularly the invention relates to spring shackles for vehicles which comprise a mass or masses of resilient non-metallic material interposed between the spring and frame to permit relative longitudinal movement between the movable end of the spring and the frame of the vehicle. In previous constructions the end of the spring has been reciprocably mounted between blocks of rubber or other resilient material which are clamped upon the frame. The present invention comprises a swinging link which is flexibly mounted upon the spring member or frame member of the vehicle and is resiliently connected to the other relatively movable member of the vehicle to permit swinging movement longitudinally of the connected members, thus giving a greater flexibility than in previous constructions and also avoiding the wear which necessarily is caused by the longer relative movements of the spring and frame members produced in previous constructions of this character.

The present invention comprises certain improvements upon the general construction illustrated in Patent No. 1,467,051 granted to me September 4, 1923, and Patent No. 1,499,388 granted to me July 1, 1924. In these patented constructions the movable end of the spring is connected to the vehicle by a link having a universal connection with the end of the spring and a pivotal connection with a member of the frame adapted to permit longitudinal swinging movement of the link, but to prevent lateral swinging movement thereof. In the present invention the upper end of the swinging link is connected to the frame by means including a resilient non-metallic member, preferably under compression, which is adapted to permit a substantially longitudinal swinging movement of the link and to prevent lateral swinging movement thereof. By reason of the present invention a spring shackle is provided which does not require lubrication, which is easily and economically constructed and which is readily replaceable if defective or worn.

Other objects and features of the invention will more fully appear from the following description and the accompanying drawing and will be particularly pointed out in the claims.

A preferred embodiment of the invention is illustrated in the accompanying drawing, in which, Fig. 1 is a side elevation of the end portion of the vehicle frame, the spring, the novel means for securing the spring to the axle of the vehicle and the novel spring shackle connecting the movable end of the spring to the frame;

Figure 1:
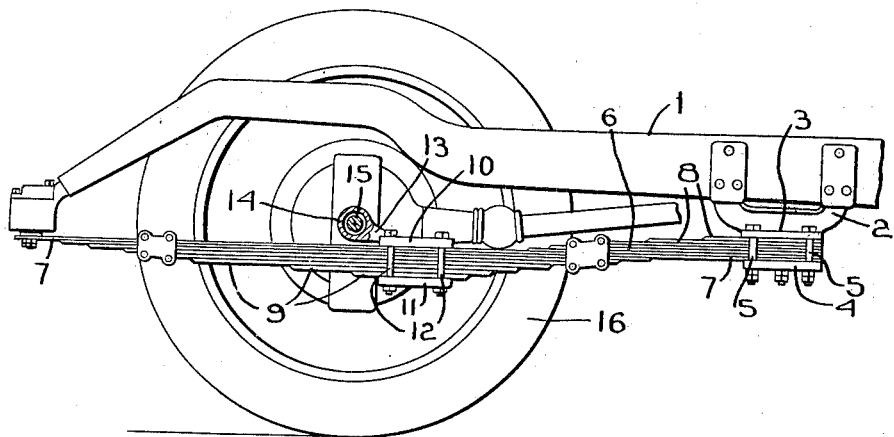

The spring suspension construction for vehicles illustrated in Fig. 1 comprises a side frame 1 of a usual type to which a spring supporting bracket 2 is riveted or bolted, the bracket having a spring seat 3 and a complementary clamping plate 4 which are secured together by bolts 5 which clamp one end of the spring 6 therebetween. The spring 6 comprises a long leaf 7 or a plurality of long leaves and at the end which is secured to the frame a series of progressively shorter leaves 8 superimposed upon the long leaf 7, all of which are clamped to the spring seat 3 by the clamping plate 4 and bolts 5. A series of progressively shorter spring leaves 9 are superimposed upon the opposite side of the central portion of the long leaf or leaves and are secured together and to an axle block 10 by a clamping plate 11 and bolts 12 extending through said clamping plate and block. The block 10 is provided with a projection 13 which extends toward the movable end of the spring and has a cylindrical boss 14 which receives and contains the bearing for the usual axle 15 for the wheel 16. The movable end of the spring is connected to the end of the frame 1 by a shackle adapted to permit relative longitudinal movement between the movable end of the spring and the frame and preferably this shackle is also of a novel construction.

The spring above described may be and preferably is similar to that disclosed in my prior Patent No. 1,443,139 granted January 23, 1923. In operation a spring of this character bends in a sinuous curve instead of the usual arc-shaped curve produced by usual types of springs, whether of the elliptical or the cantilever type as the end portion of the spring bends in one direction as the weight of the load depresses it, while the portion of the spring intermediate of the axle and of the anchorage to the frame arches up in the opposite direction.

By providing an axle block having a projection containing the axle bearing extending toward the movable end of the spring the fulcrum is carried toward the movable end of the spring and a longer leverage therefore exerted upon the section of the spring intermediate of the axle and the anchorage of the spring which causes a greater flexure of that portion of the spring. Consequently the spring is made more flexible. It therefore follows that a shorter spring may be used in a given type of vehicle than that which is required when the axle is directly above the axle block 10.

This construction is of great advantage in that a more flexible spring may be provided for standard types of vehicle frames which, when employed with suitable shock absorbing devices, will give a much easier ride than in previous constructions. Furthermore, it provides means for lengthening or shortening the wheel base without modifying the over-all length of the car.

Another important object of the invention is to provide a novel spring shackle construction which is particularly adapted for use in connection with spring suspension constructions of the type above described, but which may also be used with usual spring constructions.

Figure 2:
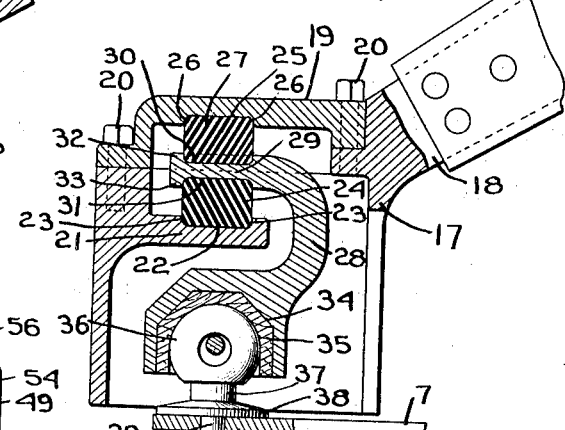
Fig. 2 is an enlarged detail view, mainly in longitudinal section, illustrating the spring shackle connected to the frame and to the spring.
Figure 3:
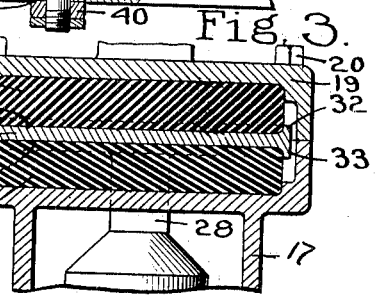
Fig. 3 is an enlarged detail view in transverse section of the spring shackle, the lower portion of the housing being broken away and the universal joint connecting the swinging link to the spring not being illustrated.

The spring shackle construction illustrated in Figs. 2 and 3 comprises a housing 17 having an arm 18 adapted to be secured to the frame of the vehicle. The housing desirably is formed in sections, preferably the hollow body section 17 having a detachable top or cover 19 secured to the body 17 by suitable cap screws 20. The body portion 17 of the housing is provided with a shelf 21 which is formed integrally with the housing and extends inwardly from one of the walls thereof. The housing 21 desirably is provided with a recess presenting a flat surface 22 of narrow width in the direction of the length of the spring and of relatively greater width transversely thereof, the walls 23 of the recess providing shoulders to engage and hold in place a mass or block 24 of resilient non-metallic material such as rubber or rubber composition. The cap 19 likewise is provided with a similar recess presenting a flat face 25 and having walls 26 which provide shoulders to engage the edges of a similar mass or block 27 of resilient non-metallic material. The blocks 24 and 27 of resilient non-metallic material desirably are clamped by the cap and shelf 21 of the housing upon the head of a link, the lower end of which is flexibly connected to the spring. As illustrated in Figs. 2 and 3 the link 28 is of substantially U-shape and provided with a head 29 having lateral extensions presenting parallel flat faces 30 and 31 which are complementary to the surfaces 25 and 22 respectively and which engage respectively the blocks 27 and 24. The head 29 of the link 28 desirably is provided with annular ribs 32 and 33 respectively which provide shoulders engaging the edges of the blocks 27 and 24 respectively. The lower end of the link 28 is provided with an enlarged boss having a socket 34 in which a block of anti-friction material 35 preferably of oil-soaked wood is mounted. The block 35 is provided with a hemi-spherical socket which receives a bolt 36 having a stem 37 provided with an enlarged base 38 which rests upon the end of the long leaf 7 of the spring and secured thereto by an integral screw threaded stud 39 which projects through the end of the spring and is clamped thereupon by suitable nuts 40.

The housing 17 has an open bottom and is of sufficient length to permit a substantial swinging movement of the link 28 longitudinally with respect to the frame and spring, or in other words longitudinally of the vehicle. The housing 17 is also of sufficient width to permit slight lateral swinging movements of the link 28 to provide for torsional movements of the spring due to different relative vertical movements of the wheels of the vehicle which are occasioned as one of the wheels is raised or lowered by an obstruction or hole which does not affect the other wheel.

By thus connecting the frame to the spring by a link having a flexible connection with the spring and connected by resilient non-metallic means to the frame the resilient non-metallic members are subjected to much less wear and strain than in constructions comprising resilient non-metallic material which have heretofore been employed. Consequently longer life is given to the shackle and more efficient service secured thereby. Furthermore a shackle of this construction requires no lubrication as the resilient member yields because of its inherent properties while the oil-soaked wood of the universal joint will not wear to any appreciable extent.

Figure 4:
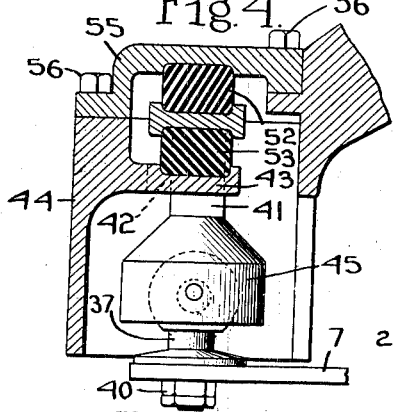
Fig. 4 is an enlarged detail view, mainly in longitudinal section, of a modified form of spring shackle; and, Fig. 5 is an enlarged view, mainly in transverse section, of the spring shackle illustrated in Fig. 4.
Figure 5:
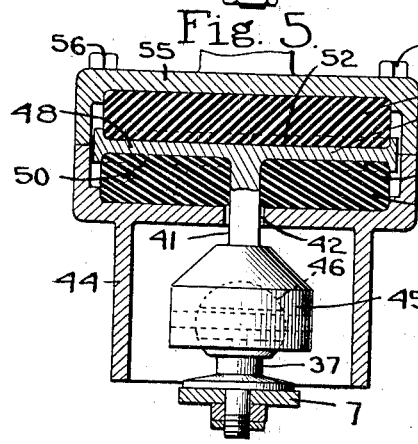

In Figs. 4 and 5 a modified construction is illustrated in which the link 41 is straight instead of curved and extends through a slot 42 in the shelf 43 of a housing 44 which may be otherwise of identical construction with that illustrated in Figs. 2 and 3. The lower end of the link is provided with an enlarged boss 45 forming a socket to receive the wooden lining and ball 46 which is connected to the spring 7 in the manner above described. The link 41 is in the form of a letter T, the lateral extensions 48 and 49 being preferably provided with recesses 50 and 51 in their lower faces presenting flat surfaces and the upper side of the head of the T with a recess presenting a flat face 52. These flat faces engage respectively blocks 53 and 54 of resilient non-metallic material which are engaged respectively by the removable cap 55 of the housing and the shelf 42 and are clamped together and upon the head of the link by cap screws 56.

The operation of the device illustrated in Figs. 4 and 5 is identical with that of the device illustrated in Figs. 2 and 3 and further description of such operation is therefore unnecessary.

It will therefore be obvious that various modifications in form, construction and arrangement of parts may be made and that the embodiment of the invention is illustrative and not restrictive with respect to the invention defined by the claims.

Having thus described the invention, what is claimed as new, and desired to be secured by Letters Patent, is:

1. A spring shackle for connecting a frame member and a spring member of a vehicle comprising a swinging link pivotally connected to one of said members and resilient clamping means connecting the same to the other member to permit substantial swinging movement longitudinally of the connected members, and substantially to prevent relative lateral movement of the connected members.

2. A spring shackle connecting a frame member and a spring member of a vehicle comprising a link clamped to one of said members by means including a mass of resilient material acting to permit a substantial swinging movement longitudinally of said members substantially to prevent lateral relative movement between said members and means flexibly connecting said link to the other member.

3. A spring shackle connecting a frame member and a spring member of a vehicle comprising a link having a head presenting a substantially flat face, means for clamping said head to one of said members including a mass of resilient material engaging said flat face under compression and acting to permit a substantial swinging movement longitudinally of said members and means pivotally connecting the other end of said link to the other member.

4. A spring shackle construction for vehicles comprising a frame member and a spring member one of which presents a pair of oppositely disposed surfaces of narrow width in the longitudinal direction of said spring member and relatvely greater length transversely thereof, resilient members seated on said surfaces,—a swinging link construction having complementary surfaces oppositely engaging said resilient members, means for clamping said resilient members between said surfaces and means flexibly connecting said link construction to the other vehicle member.

5. A spring shackle construction for vehicles comprising a frame member and a spring member one of which presents a pair of oppositely disposed recesses having flat bases of narrow width in the longitudinal direction of said spring and of relatively greater length transversely thereof, resilient members seated in said recesses, a swinging link construction having complementary recesses oppositely engaging said resilient members, means for clamping said resilient members therebetween, and means flexibly connecting said link construction to the other vehicle member.

6. A spring shackle for vehicles comprising a housing adapted to be connected to the frame of a vehicle, a swinging link, means including a plurality of resilient members clamping the same in said housing to permit substantial swinging movement thereof longitudinally of the vehicle and to prevent lateral swinging movement thereof and means pivotally connecting said swinging link to the vehicle spring.

7. A spring shackle for vehicles comprising a housing adapted to be connected to the frame of a vehicle, a swinging link having a head secured to the housing between bodies of non-metallic resilient material yieldable to permit substantial swinging movement of said link longitudinally of the vehicle and substantially to prevent lateral swinging movement of said link and a flexible connection between said swinging link and the spring.

8. A spring shackle for vehicles comprising a housing adapted to be connected to the frame of a vehicle and formed in separable parts presenting substantially parallel flat faces, a swinging link having a transversely extending head located intermediate of said housing sections and presenting flat faces substantially parallel to those of the housing sections, resilient means interposed between the faces of said head and the respective faces of said housing sections, means for clamping together the sections of said housing to compress said resilient means upon the head of the link and means flexibly connecting said link to the spring.

9. A spring shackle for vehicles having a housing adapted to be connected to the frame of a vehicle and formed in separable parts and having recesses presenting substantially parallel flat faces, a swinging link having a transversely extending head located intermediate of said sections and presenting recesses complementary to the recesses of said housing and substantially parallel thereto, resilient non-metallic members seated in the complementary recesses of said head and housing, means for securing the sections of said housing together to clamp said resilient members upon said head under compression and means including a universal joint for connecting the other end of said link to the spring.

10. A spring shackle for vehicles having a housing adapted to be connected to the frame of a vehicle and formed in separable parts and having recesses presenting substantially parallel flat faces, a swinging link having a transversely extending head located intermediate of said sections and presenting recesses complementary to the recesses of said housing and substantially parallel thereto, resilient non-metallic members seated in the complementary recesses of said head and housing, means for securing the sections of said housing together to clamp said resilient members upon said head under compression, a socket upon the other end of said link, a lining of fibrous material for said socket having a bolt-receiving recess and a bolt rigidly secured to the end of the spring fitting said socket.

11. A spring shackle construction for vehicles comprising a frame member and a swinging link member connected to the spring, one of which members is provided with oppositely disposed seats for resilient non-metallic blocks having a narrow width in the longitudinal direction of the spring and relatively great width transversely thereof, and the other of which members is provided with complementary seats to engage the opposite faces of the respective blocks, and means for clamping said seats upon said blocks, whereby a relatively free swinging movement of said link is permitted in the longitudinal direction of the spring, but lateral swinging movement of said link is substantially prevented.

In testimony whereof, I have signed my name to this specification.

RALPH M. LOVEJOY.